March 28, 1939.   R. D. CLEMSON   2,152,278
MOWER
Filed June 18, 1937

INVENTOR
RICHARD D. CLEMSON
BY
ATTORNEYS

Patented Mar. 28, 1939

2,152,278

UNITED STATES PATENT OFFICE 2,152,278

MOWER

Richard D. Clemson, Middletown, N. Y., assignor to Clemson Bros., Inc., Middletown, N. Y., a corporation of New York Application June 18, 1937, Serial No. 148,835

3 Claims. (Cl. 56—249)

This invention relates to lawn mowers.

Lawn mowers for many years prior to my invention have been made to a standard design, consisting essentially of heavy cast iron wheels, a heavy cast iron frame, a reel consisting of forged spiral blades riveted to forged or cast spiders and mounted on a steel shaft, driven through a simple ratchet pinion and ring gear from the ground wheels and a wooden handle with strap iron arms secured to the handle at one end and to the frame at the other. Minor variations on this design have been made from time to time, and motor drives have been provided or the handle has been eliminated and the frame modified for pulling behind a draft animal or tractor; but in general construction and design there has been remarkably little change for more than 25 years.

These mowers as known to the prior art have generally been excessively heavy and, therefore, difficult to maneuver as well as carry from place to place and the handles have been secured to the frame and other parts by bolts or riveted in place, which makes a cumbersome unit for transporting from place to place.

These structures have relied largely upon their excessive weight to provide traction to hold them in uniform contact with the ground, and to maintain the relationships of the parts. Due to this excessive weight and lack of complete rigidity in frame it is ordinarily not satisfactory to use such a mower for edging in locations where only one wheel can be held in contact with the ground, since such operation produces a wrenching of the machine which tends to distort the adjustment between the shear blades and requires a twisting torque applied to the handle which is difficult to maintain due to the tendency of the heavy mower mechanism to jump or "buck" with varying density of the material being cut and especially when an obstacle is encountered which cannot be cut and blocks the rotation of the reel.

Even upon level ground with both wheels in contact with the ground this tendency to jump or "buck" is noticeable in all such prior mowers and offers a serious obstacle to the production of a satisfactory appearance in a lawn or uneven ground or with uneven density of plant growth.

Accordingly, it is an object of my present invention to provide a mower which will overcome these disadvantages.

One object of my invention is to provide a mower which is relatively light and easily handled.

Another object of the invention is to provide a mower which will be relatively free from any tendency to jump or "buck".

Another object of the invention is to provide a mower in which adequate traction for driving the mechanism from the wheel is attained without excessive weight.

In the accompanying drawing I have shown a mower embodying my invention which achieves these objects. Although I have shown a preferred embodiment of my invention and described the same in the specification it is to be understood that the invention is not limited to this preferred embodiment, but on the contrary it is given only for purposes of illustration in order that others may understand the invention and its operation; and the accompanying description is designed to enable others skilled in the art to apply the invention and embody it in numerous and varied forms, each as may be best adapted to the requirements of any particular problems or condition.

Figure 1:
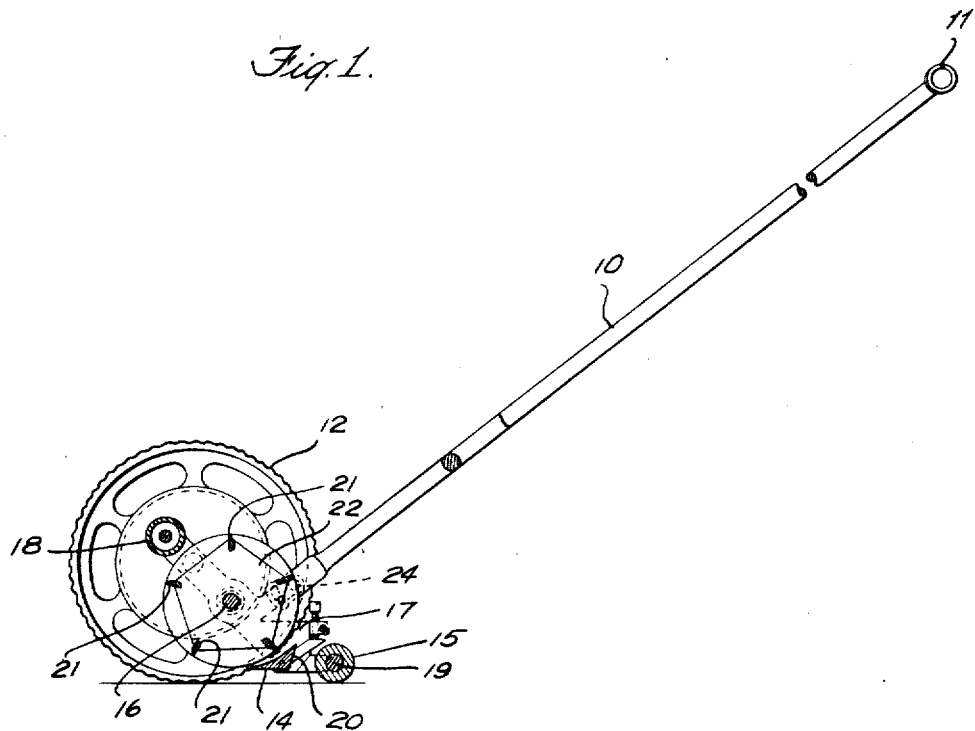
Fig. 1 is a view in vertical section taken on line 1—1 of Fig. 2.
Figure 2:
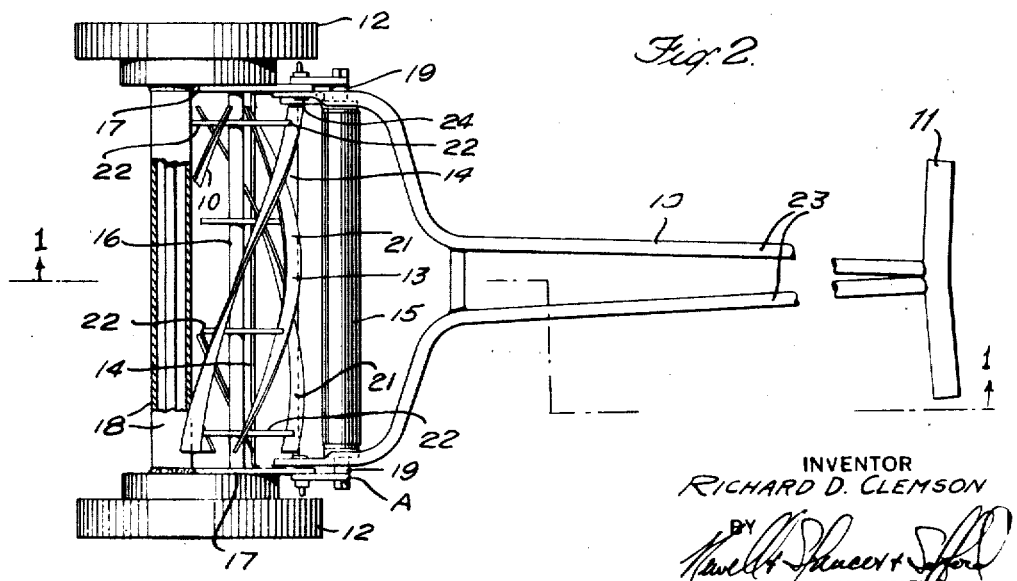
Fig. 2 is a top plan view.

The mower shown in these figures comprises broadly a frame 10, a handle 11, ground wheels 12, a reel 13, a bed knife 14 and a ground roller 15.

In principle of operation this mower is similar to others known prior to my invention. The ground wheel 12 contains an internal ring gear (not shown) which meshes with a pinion connected to the end of the shaft 16 of the reel 13 by means of a ratchet or over-running clutch (not shown). The side members 17 of the frame 10 are connected together by the cross member 18 and also by the shaft 19 on which the ground roller 15 is rotatably mounted. The bed knife 14 and its back 20 upon which it is mounted are rotatably adjustable about a pivotal mounting to press the cutting edge more or less tightly against the edges of the fly knives 21 on the reel to form a shear therewith.

The construction is distinguished from any known to the prior art primarily in its design for the elimination of excess weight, in the rigidity of its frame, in the removable mounting of the handle, and in the point of attachment and angle of the handle to the frame.

Excess weight has been eliminated by the use of light metal castings and of high strength metals in shapes which give great rigidity and strength with relatively small weight and mass. In the example illustrated, the wheels 12, the side frames 17 and the spiders 22 of the reel, and the bed knife back 20 are all cast of light metal, as for example, an aluminum or zinc die-casting metal. The cross member 18, the ground roller 15 and the handle 11 are all made of tubular steel, giving high strength and rigidity due to the nature of the metal and the tubular shape and with relatively small mass of metal and, therefore, low weight.

The large diameter of the tubular cross member 18 clamped against the side frames 17 gives to the assembled frame great rigidity as compared with mowers as commonly used in the prior art and this rigidity is further reinforced by means of the shaft 19 at the opposite end of the frame.

Because of the rigidity thus attained and the other features of the construction by which wrenching and "bucking" of the frame are avoided, the handle in this preferred example can be made readily removable from the frame by the simple expedient of flattening the tubular stock, of which the handle is made, at the end of the lateral arms 23, piercing the flattened portions with a hole 25 which fits a stud 24 on the frame and then snapping the handle into place, with the studs 24 in the holes 25 in the arms 23, by the resilient bending of the arms 23.

Advantageously the handle is made with the spread of the arms 23, when they are free, slightly greater than the distance between the side frames 17 at the bases of the studs 24. Thus when the handle is in place it still exerts a resilient pressure against the side frames helping to hold itself securely in position on the frame and moreover avoiding any rattling between the handle and the frame.

The placing of the studs 24 is important. In mowers as commonly made prior to my invention the handle has been connected so that the force applied to the handle is exerted on a line extending in front of the contact of the wheels with the ground and there serves almost entirely to effect forward movement of the mower. Such a construction must rely almost entirely upon excess weight to hold the mower in the desired operative relation with the ground.

In the construction according to my present invention I have made possible the elimination of the excess weight and at the same time have reduced and almost eliminated the tendency of the machine to jump and "buck" by placing the point of connection between the handle and the frame behind the shaft 15 and sufficiently low so that when the handle is in its operating position its central plane along which the force is directed passes behind the reel shaft and, in the preferred embodiment, through or advantageously behind the points of contact between the wheels 12 and the ground.

The considerations which control the novel placing of the handle in my mower may best be understood by considering the mower first with its wheels blocked against forward movement and secondly with its reel blocked against rotation. The frame, being pivotally connected both to the ground wheels 12 and to the ground roller 15, may turn about either as a fulcrum; and force applied along the handle, therefore, exerts a turning moment about each tending to press the other toward the ground. The relative magnitude of these moments depends upon the respective distances from the pivots of the wheels and roller respectively of the plane in which force is applied along the handle to the mower. To increase the downward pressure on the wheels the handle should be moved away from the ground roller to lengthen the moment arm from the roller; to increase the downward pressure on the roller, conversely the spacing of the handle from the wheel must be increased.

This, however, considers the wheels and roller as anchored. When the mower is in use the forward component of the force on the handle acting against the ground exerts a turning moment on the wheel. If the reel were to run perfectly free, this would have no effect on the pressure of the wheels against the ground, and probably for this reason, the actual effect of this turning moment has never been properly utilized in prior mower designs.

To the extent that the reel is not free to turn, but is resisted by the grass or other material engaged between the fly knives and bed knife, this turning moment is transmitted to the frame. According to the invention this effect is utilized to increase the traction of the wheels.

In the operation of the mower force is applied through the handle to the frame at an angle which may be resolved into a component perpendicular to the radius of the ground roller (which produces a direct downward pressure on the wheel by the turning moment around the roller) and a second component parallel to the ground (which tends to produce forward motion). The latter, however, due to the traction of the wheel produces a turning moment on the wheel; and this as already stated is transmitted to the frame to the extent that rotation of the reel is resisted. When the handle is located as in the prior art, this moment tends to lift the frame and the roller off the ground in what I have referred to as "bucking". If, however, the handle is properly placed according to the present invention, the force tending to lift the frame due to this turning moment is always less than the component of the force on the handle which exerts an opposite turning moment upon the frame; therefore, the frame cannot "buck" and the force instead is smoothly applied against the handle stimulating a greater force by the operator with the result of increasing the pressure of the wheels against the ground, i. e., the traction.

Thus one avoids the need for excess weight to give traction and the effective traction is automatically adjusted to the requirements of the cut.

The angle of attack of the handle is important because it determines both the component of the applied force which acts directly to press down the ground wheels and the turning moment exerted on the frame in opposition to that exerted by the reaction to the reel drive.

The placing of the point of attachment of the handle according to the invention requires that the moment of force applied to the handle shall be at least equal to the moment of the reaction force applied to the frame from the wheels when the reel is blocked.

Due to the angle between the handle and the frame and the positioning of the studs 24 the force exerted on the handle serves to hold both the ground wheels 12 and the ground roller 15 against the ground and in the event that the reel becomes blocked by some obstacle which it cannot cut the tractive effort and inertia reacts directly against the handle instead of causing the ground wheel and bed knife to jump as in the older construction. Moreover, due to the elimination of excess weight the force thus exerted from inertia is very much less than with the mowers heretofore in use and in this way also any tendency of the mower to jump is further reduced.

All of this is particularly important with the removable handle and in case the machine is being operated on one wheel for edge trimming, etc., because under such circumstances a direct reaction against the handle can be absorbed without wrenching the handle free from the frame, whereas, with the twisting and jumping tendency of the older machines a removable handle under the circumstances would be wrenched off, thus would be impracticable.

The handle as shown in the drawing is constructed of welded steel tubes and thus forms an integral one-piece unit. This is important in the detachable construction because it eliminates all danger of any parts becoming loose and the handle thus becoming detached from the machine in operation. It is particularly important also in the operation of the machine, as already described, on one wheel for edge trimming because it eliminates the tendency for any part of the handle to become wrenched loose from or distorted with relation to one another as frequently occurs in the operation of the older machines.

The form of the handle shown and the pivotal mounting on the mower apart from the angular relationship as herein claimed is more particularly set forth and claimed in my copending application, Serial No. 256,379, filed February 14, 1939.

It will thus be seen that I have combined in the construction shown, each of which is desirable in itself, but would also be objectionable in other ways were it not for the presence of the others, which in the combination overcome these inherent objections. The combination, therefore, is superior in every respect to the machines known prior to my invention.

What I claim is:

1. In combination with a lawn mower having a substantially rigid frame, a wheel on each side of said frame making tractive contact with the ground, a rotary cutting reel comprising spiral fly knives mounted on said frame between said wheels, means operatively connecting said reel and said wheels to cause rotation of said reel when said wheels are rotated, a handle attached to said frame and a bed knife positioned to make a shearing contact with said fly knives when said reel is rotated; means for pivotally attaching said handle to each side of the frame at a point below the horizontal plane of the axis of said wheels and to the rear of the axis of said cutting reel.

2. In combination with a lawn mower having a substantially rigid frame, a wheel on each side of said frame making tractive contact with the ground, a rotary cutting reel comprising spiral fly knives mounted on said frame between said wheels, means operatively connecting said reel and said wheels to cause rotation of said reel when said wheels are rotated, a handle attached to said frame and a bed knife positioned to make a shearing contact with said fly knives when said reel is rotated; means for pivotally attaching said handle to each side of the frame at a point thereon approximately along the plane joining the contact of the wheels with the ground and the upper end of the handle when in normal operative position and to the rear of the axle of said reel.

3. In combination with a lawn mower having a light metal substantially rigid frame, a wheel on each side of said frame making tractive contact with the ground, a rotary cutting reel comprising spiral fly knives about a shaft mounted for rotation on said frame between said wheels, means operatively connecting said reel and said wheels to cause rotation of said reel when said wheels are rotated, a handle attached to said frame and a bed knife positioned to make shearing contact with said fly knives when said reel is rotated; means for pivotally attaching said handle to each side of the frame at a point to the rear of a plane connecting the upper end of the handle when in normal operative position and the points of contact of the wheel with the ground and to the rear of the axle of said reel.

RICHARD D. CLEMSON.

DISCLAIMER 2,152,278.—*Richard D. Clemson*, Middletown, N. Y. MOWER. Patent dated March 28, 1939. Disclaimer filed February 26, 1941, by the assignee, *Clemson Bros., Inc.*

Hereby disclaims from the scope of claim 1—

All mowers in which the plane joining the upper end of the handle, where propelling force is applied thereto and the line of contact of the wheels with the ground, when the handle is in normal operating position, passes in front of the axis of pivotal attachment of the handle to the frame.

[*Official Gazette, March 25, 1941.* the mowers heretofore in use and in this way also any tendency of the mower to jump is further reduced.

All of this is particularly important with the removable handle and in case the machine is being operated on one wheel for edge trimming, etc., because under such circumstances a direct reaction against the handle can be absorbed without wrenching the handle free from the frame, whereas, with the twisting and jumping tendency of the older machines a removable handle under the circumstances would be wrenched off, thus would be impracticable.

The handle as shown in the drawing is constructed of welded steel tubes and thus forms an integral one-piece unit. This is important in the detachable construction because it eliminates all danger of any parts becoming loose and the handle thus becoming detached from the machine in operation. It is particularly important also in the operation of the machine, as already described, on one wheel for edge trimming because it eliminates the tendency for any part of the handle to become wrenched loose from or distorted with relation to one another as frequently occurs in the operation of the older machines.

The form of the handle shown and the pivotal mounting on the mower apart from the angular relationship as herein claimed is more particularly set forth and claimed in my copending application, Serial No. 256,379, filed February 14, 1939.

It will thus be seen that I have combined in the construction shown, each of which is desirable in itself, but would also be objectionable in other ways were it not for the presence of the others, which in the combination overcome these inherent objections. The combination, therefore, is superior in every respect to the machines known prior to my invention.

What I claim is:

1. In combination with a lawn mower having a substantially rigid frame, a wheel on each side of said frame making tractive contact with the ground, a rotary cutting reel comprising spiral fly knives mounted on said frame between said wheels, means operatively connecting said reel and said wheels to cause rotation of said reel when said wheels are rotated, a handle attached to said frame and a bed knife positioned to make a shearing contact with said fly knives when said reel is rotated; means for pivotally attaching said handle to each side of the frame at a point below the horizontal plane of the axis of said wheels and to the rear of the axis of said cutting reel.

2. In combination with a lawn mower having a substantially rigid frame, a wheel on each side of said frame making tractive contact with the ground, a rotary cutting reel comprising spiral fly knives mounted on said frame between said wheels, means operatively connecting said reel and said wheels to cause rotation of said reel when said wheels are rotated, a handle attached to said frame and a bed knife positioned to make a shearing contact with said fly knives when said reel is rotated; means for pivotally attaching said handle to each side of the frame at a point thereon approximately along the plane joining the contact of the wheels with the ground and the upper end of the handle when in normal operative position and to the rear of the axle of said reel.

3. In combination with a lawn mower having a light metal substantially rigid frame, a wheel on each side of said frame making tractive contact with the ground, a rotary cutting reel comprising spiral fly knives about a shaft mounted for rotation on said frame between said wheels, means operatively connecting said reel and said wheels to cause rotation of said reel when said wheels are rotated, a handle attached to said frame and a bed knife positioned to make shearing contact with said fly knives when said reel is rotated; means for pivotally attaching said handle to each side of the frame at a point to the rear of a plane connecting the upper end of the handle when in normal operative position and the points of contact of the wheel with the ground and to the rear of the axle of said reel.

RICHARD D. CLEMSON.

DISCLAIMER 2,152,278.—*Richard D. Clemson*, Middletown, N. Y. MOWER. Patent dated March 28, 1939. Disclaimer filed February 26, 1941, by the assignee, *Clemson Bros., Inc.*

Hereby disclaims from the scope of claim 1—

All mowers in which the plane joining the upper end of the handle, where propelling force is applied thereto and the line of contact of the wheels with the ground, when the handle is in normal operating position, passes in front of the axis of pivotal attachment of the handle to the frame.

[*Official Gazette, March 25, 1941.*